(12) United States Patent
Gilbert

(10) Patent No.: US 7,025,404 B1
(45) Date of Patent: Apr. 11, 2006

(54) CONVERTIBLE VEHICLE MESH COVER

(76) Inventor: Gloria J. Gilbert, 300 Cartwright St., Pensacola, FL (US) 32507

( * ) Notice: Subject to any disclaimer, the term of this patent is extended or adjusted under 35 U.S.C. 154(b) by 0 days.

(21) Appl. No.: 11/183,083

(22) Filed: Jul. 18, 2005

(51) Int. Cl.
B62D 25/06 (2006.01)

(52) U.S. Cl. ............ 296/102; 296/107.09; 296/136.13; 135/913

(58) Field of Classification Search ........... 296/107.01, 296/107.06, 107.08, 107.09, 136.1, 136.13, 296/102; 160/DIG. 2; 135/913
See application file for complete search history.

(56) References Cited

U.S. PATENT DOCUMENTS

| | | | |
|---|---|---|---|
| 2,460,399 A | 2/1949 | Schassberger |
| 2,463,646 A | 3/1949 | Schassberger |
| D155,614 S | 10/1949 | Klein et al. |
| 2,682,427 A | 6/1954 | Bright |
| 3,053,566 A | 9/1962 | Allenbaugh |
| 3,167,349 A | 1/1965 | Young et al. |
| D250,330 S | 11/1978 | Hickman et al. |
| 4,179,152 A | 12/1979 | Kent, Jr. |
| D257,531 S | 11/1980 | Hickman et al. |
| D259,340 S | 5/1981 | Stengel |
| D267,487 S | 1/1983 | Ragsdale |
| D268,408 S | 3/1983 | Ruggles |
| 4,600,235 A | 7/1986 | Frederick et al. |
| D291,676 S | 9/1987 | Noble |
| D322,055 S | 12/1991 | Bruce et al. |
| 5,211,718 A | 5/1993 | Gotz et al. |
| 5,219,201 A | 6/1993 | Gotz et al. |
| 5,299,850 A | 4/1994 | Kaneko et al. |
| D384,324 S | 9/1997 | Barker |
| D394,638 S | 5/1998 | Weiner et al. |
| 5,765,903 A | 6/1998 | Essig et al. |
| 5,803,529 A | 9/1998 | Perry-Bores et al. |
| D408,781 S | 4/1999 | Gordon |
| 5,992,917 A | 11/1999 | Hilliard et al. |
| 6,164,714 A | 12/2000 | Gleason et al. |
| 6,189,962 B1 | 2/2001 | Henderson |
| 6,206,454 B1 | 3/2001 | Cory |
| 6,270,145 B1 | 8/2001 | Kamo et al. |
| 6,279,986 B1 | 8/2001 | Hinsperger |
| 6,338,522 B1 | 1/2002 | LeBlanc |
| 6,505,880 B1 | 1/2003 | Castro |
| D474,145 S | 5/2003 | Dawson et al. |
| 2002/0145306 A1* | 10/2002 | McGrath ................ 296/136 |

* cited by examiner

Primary Examiner—Jason Morrow
(74) Attorney, Agent, or Firm—Peter Loffler

(57) ABSTRACT

A convertible vehicle mesh cover has a first section that covers the roof and if desired the back of the passenger compartment of a vehicle and has a pocket for receiving a sun block member for blocking the sun above the passenger compartment. A second section is used to cover the second or cargo section of the vehicle, in square back, fast back, or tarp covering fashion. A cover can cover the vehicle when the vehicle is not in use and can be rolled up with the first section and the second section inside in order for the cover to function as a carrying case.

24 Claims, 7 Drawing Sheets

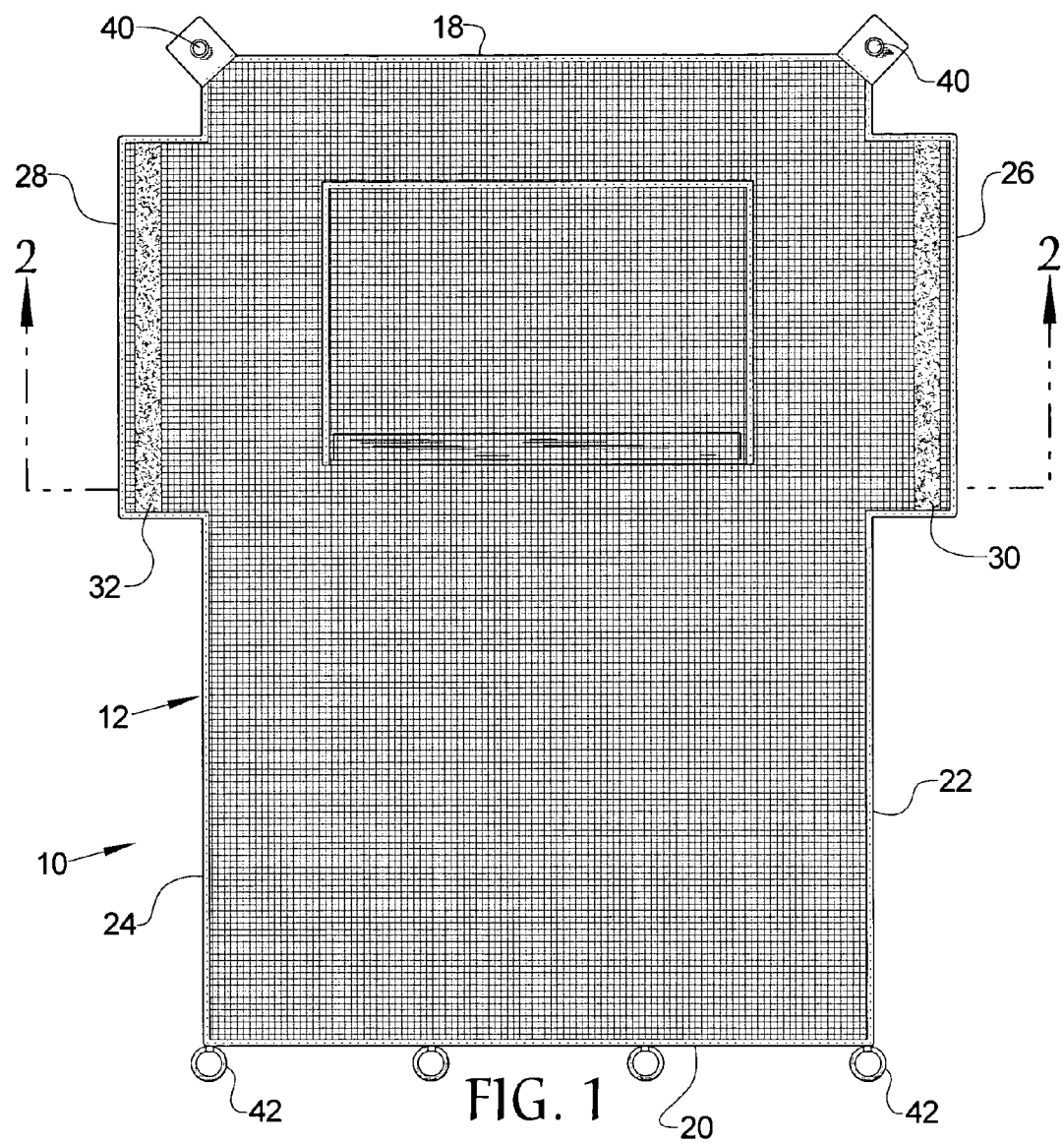
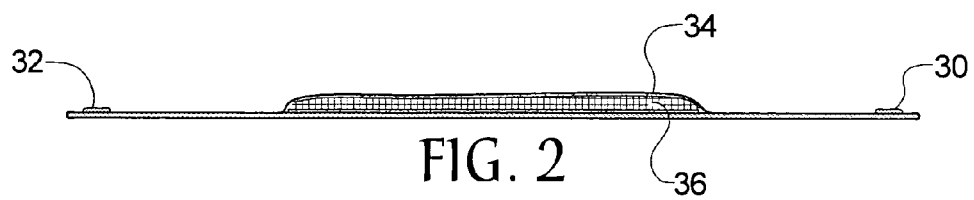

CONVERTIBLE VEHICLE MESH COVER

BACKGROUND OF THE INVENTION

1. Field of the Invention

The present invention relates to a mesh type of material used as a cover on convertible vehicles especially to open top and open side sport utility vehicles.

2. Background of the Prior Art

Convertibles are very popular as they allow a driver to in effect be outside while driving in the vehicle. One specific type of convertible that is very popular is the short bed sport utility vehicle such as the JEEP WRANGLER and the SUZUKI SAMURAI. Such vehicles are characterized by having a front passenger compartment and a rear cargo deck, which deck may also have seating therein. The front passenger seats typically delineate the front passenger compartment from the rear cargo compartment as does a roll bar. Generally, the roof, as well as the cargo compartment as well as the space behind the front seats are open and the passenger windows may either be of conventional design or may be plastic and removable. These types of vehicles are very fun to drive as they are open and give the driver and passengers a great feel for the road as well as the great outdoors. However, one problem experienced by many drivers is that after spending extended time in the vehicle, the sun can be quite strong on the occupants. Additionally, in off road travel, dust and debris enters the passenger compartment as well as the cargo compartment, making the experience somewhat unpleasant for the occupants.

One method to combat these problems is simply to place the original vehicle cover, which is either a soft top vinyl type of cover or a hard plastic shell cover back onto the vehicle to block the sun and the debris encountering the passengers. However, this solution merely defeats the basic purpose of the vehicle to provide an open and airy ride for the driver and passengers.

Another solution is to use a mesh-type cover to cover some of the open areas of the vehicle. The mesh covers have the advantage in that they only partially block the sun, thereby preventing the passengers from frying while allowing some sun onto their skin. Additionally, the mesh cover blocks much of the unwanted debris from entering the vehicle while allowing the wind to rush through the vehicle, which is desired by owners of such vehicles.

However, the problem with present mesh covers is that they tend to be unduly complex in design and construction making installation and use of such covers awkward and less than desirable. Spending a good part of the day installing the cover onto the vehicle takes away valuable beach time. Additionally, some covers are very simple in operation in that they cover the entire passenger and cargo compartments in a single fashion. This prevents the user from covering a portion of the vehicle with the mesh cover while leaving other portions open, thereby restricting versatility of the device.

Accordingly, there exists a need in the art for a cover for a convertible vehicle that addresses the above-stated shortcomings found in the prior art devices. Specifically, such a cover must cover all or just some open portions of the vehicle depending on the desires on the user. The cover must only partially cover its intended compartments so that the wind and some sun can pass through the cover. The cover must be of relatively simple design and construction so that it is relatively easy to install onto the vehicle when needed and remove therefrom when use is no longer desired.

SUMMARY OF THE INVENTION

The convertible vehicle mesh cover of the present invention addresses the aforementioned needs in the art. The convertible vehicle mesh cover is a mesh-type cover that covers all or just some open portions of the vehicle depending on the desires of the user. The convertible vehicle mesh cover is an open mesh that only partially covers its intended compartments allowing the wind and some sun to pass through the mesh cover. The convertible vehicle mesh cover is of relatively simple design and construction and is relatively easy to install onto the vehicle when needed and remove therefrom when use is no longer desired.

The convertible vehicle mesh cover of the present invention is comprised of a first mesh section that has a first top edge, and a first bottom edge joined by a first side and a second side, a first flap that extends from the first side, and a second flap that extends from the second side. A pocket is located on the first mesh section between the first flap and the second flap. A block member is removably disposed within the pocket. The first mesh section is installed onto a vehicle such that the first top edge is attached to a windshield frame of the vehicle, the first flap encompasses a driver door frame of the vehicle and attaches to the first mesh section, the second flap encompasses a passenger door frame of the vehicle and attaches to the first mesh section, and the first bottom edge either attaches to the front passenger seats of the vehicle or rolls about the roll bar of the vehicle and attaches to the roll bar. The block member is opaque and is a flexible sheet member. A first section of hook and loop material is located on the first flap while a second section of hook and loop material is located on the second flap such that the first flap attaches to the first mesh section via the first section of hook and loop material and the second flap attaches to the first mesh section via the second section of hook and loop material. The first top edge of the first mesh section is attached to the windshield frame via at least one snap. A second mesh cover has a second top edge, a second bottom edge joined by a third side and a fourth side, a third flap that extends from the third side, and a fourth flap that extends from the fourth side such that the second mesh section is installed onto the vehicle by attaching the third side to a left side wall of the cargo compartment of the vehicle, attaching the fourth side to the right side wall of the cargo compartment of the vehicle, attaching the second bottom edge to the back wall of the cargo compartment of the vehicle and attaching the second top edge to the roll bar. The second mesh cover may be installed onto the vehicle in square back fashion, in fast back fashion, or in tarp covering fashion. In order to install the second mesh cover in fast back fashion a third section of hook and loop material is located on the third flap, a fourth section of hook and loop material located on the fourth flap and the third flap attaches to the second mesh section via the third section of hook and loop material and the fourth flap attaches to the second mesh section via the fourth section of hook and loop material. A section of hook and loop material is located on the second mesh section proximate the second top edge so that the second top edge can encompass the roll bar and attach to the second mesh section via this section of hook and loop material. A first strap may be attached to the third side proximate the third flap while a second strap may be attached to the fourth side proximate the fourth flap in order to pull the second mesh cover tight whenever the second mesh cover is in tarp covering configuration. A cover has an outer periphery and a handle that is removably attachable to the vehicle by attaching a portion of the outer periphery to the left side wall, the right side wall and the back wall and by hooking the handle over a pair of mirrors of the vehicle.

BRIEF DESCRIPTION OF THE DRAWINGS

FIG. 1 is a bottom plan view of the passenger compartment section of the convertible vehicle mesh cover of the present invention.

FIG. 2 is a section view of the passenger compartment section taken along line 2—2 in FIG. 1.

Similar reference numerals refer to similar parts throughout the several views of the drawings.

DESCRIPTION OF THE PREFERRED EMBODIMENT

Figure 3:
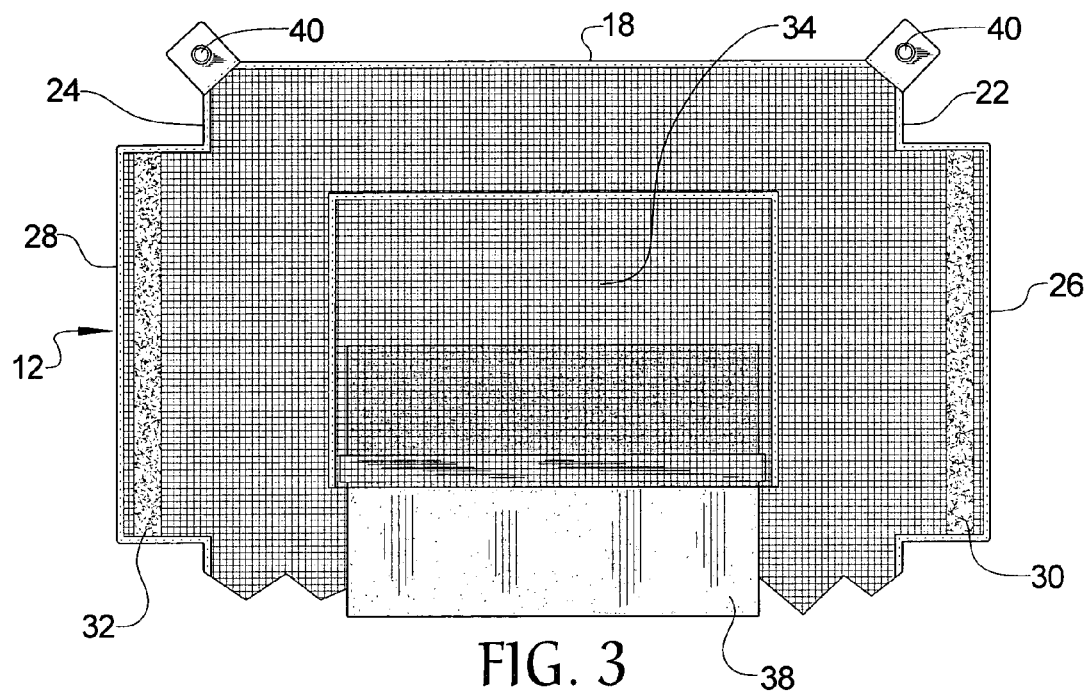
FIG. 3 is a bottom plan view of the passenger compartment section receiving a block member.
Figure 4:
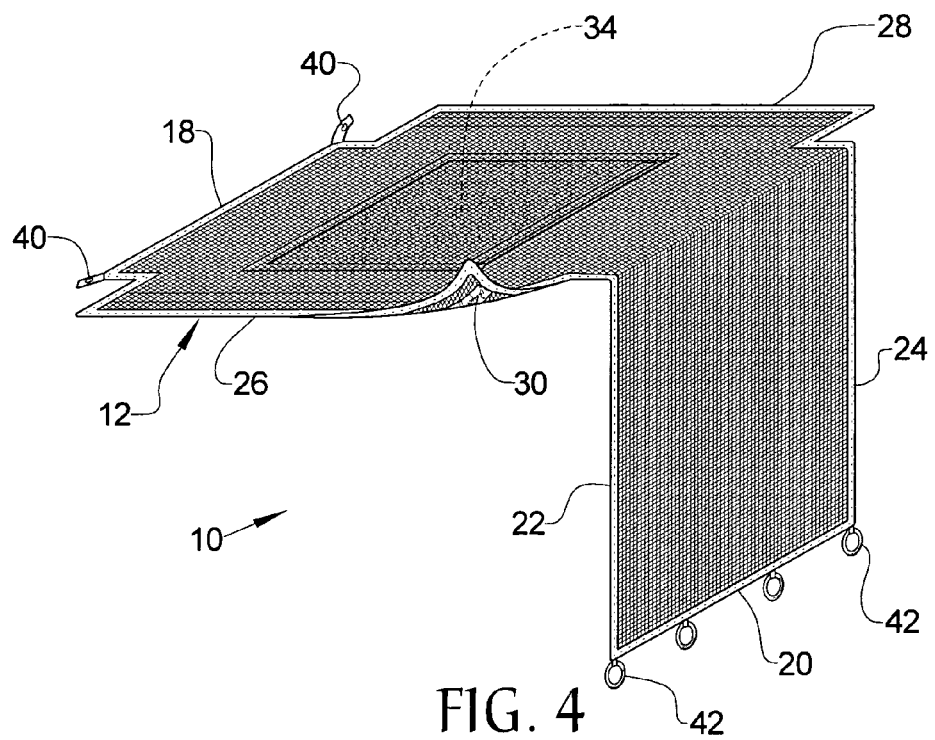
FIG. 4 is a perspective view of the passenger compartment section.
Figure 5:
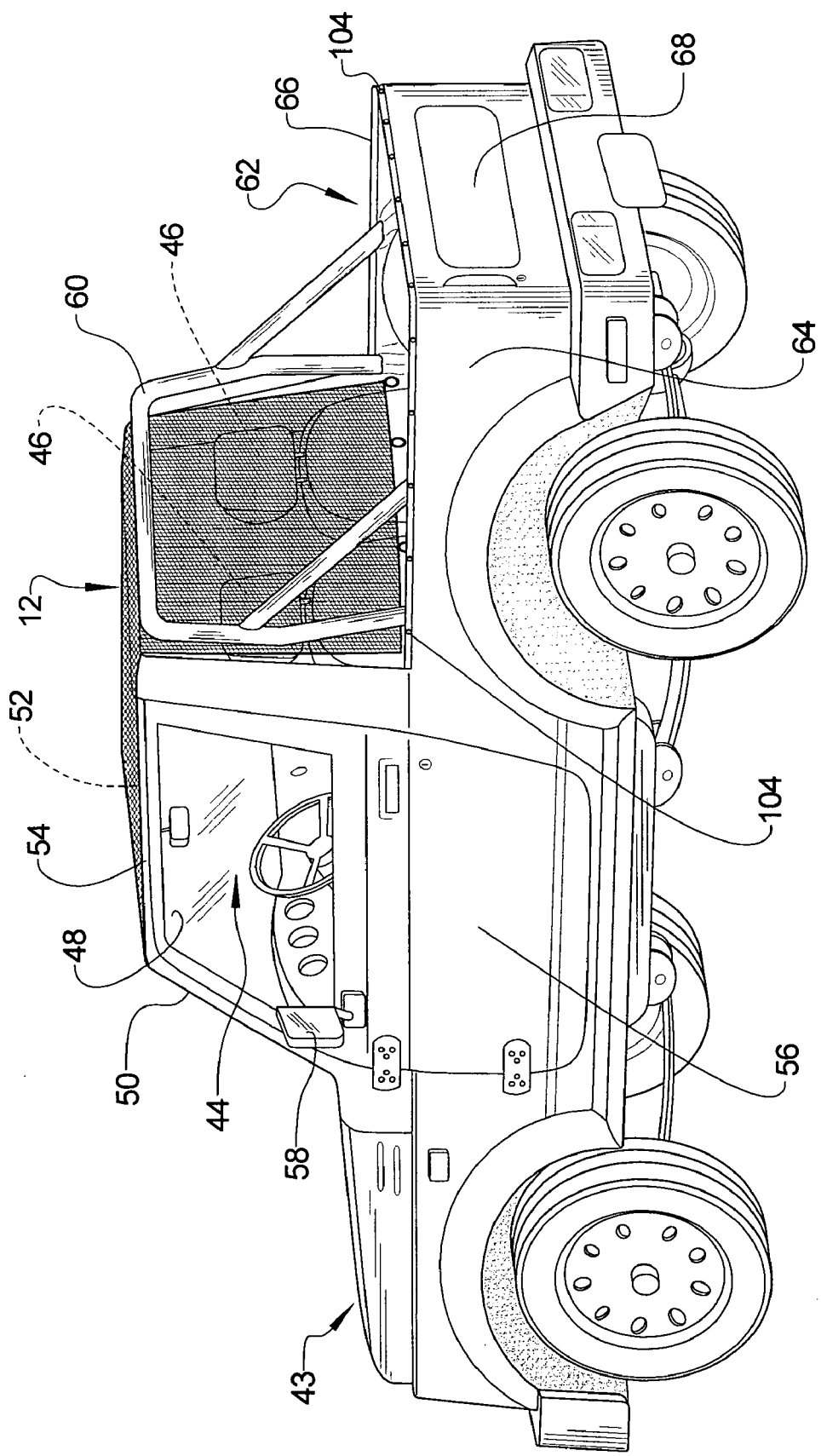
FIG. 5 is a perspective view of the passenger compartment section installed on a vehicle.
Figure 6:
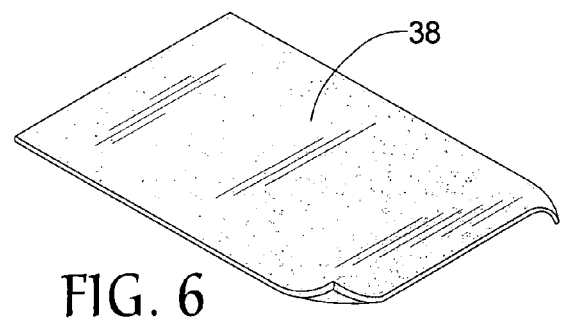
FIG. 6 is a perspective view of the block member.
Figure 7:
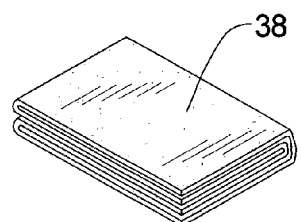
FIG. 7 is a perspective view of the block member in a folded configuration for storage and transport.

Referring now to the drawings, it is seen that the convertible vehicle mesh cover of the present invention, generally denoted by reference numeral 10, is comprised of a first mesh section 12, a second mesh section 14, and a cover 106. As seen in FIGS. 1–7, the first mesh section 12 is made from a mesh-type of material, which may be a cattle cover type of material (plastic coated string) and has a first top edge 18 and a first bottom edge 20 joined by a first side 22 and a second side 24. A first flap 26 extends from the first side 22 while a second flap 28 extends from the second side 24. A first section of hook and loop material 30 is located on the first flap 26 while a second section of hook and loop material 32 is located on the second flap 28, A pocket 34 is located on the first mesh section 12 between the first flap 26 and the second flap 28 and removably receives, through an opening 36, a block member 38 which is an opaque sheet member that is flexible and is made from an appropriate flexible material such as flexible plastic, vinyl covered cardboard, etc. Attachment means, such as the illustrated snaps 40 are located along the first top edge 18 and along the first bottom edge 20 such as the illustrated eyelets 42. It is expressly recognized that other attachment means can be provided on the first top edge 18 (eyelets, hook and loop material, etc.), and on the first bottom edge (snaps, hook and loop material, etc.) in keeping within the scope and spirit of the present invention 10.

As seen, a vehicle 43 has a first passenger compartment 44 which has a pair of seats 46, a windshield 48 with a windshield frame 50 to hold the windshield 48, a roof 52 with a pair of door frames 54 above the doors 56, mirrors 58, a roll bar 60 that separates the passenger compartment 44 from a second cargo compartment 62 that has a left side wall 64, a right side wall 66, and a back wall 68, which may be unitary with the left side wall 64 and the right side wall 66 or may be a drop down cargo door. The cargo compartment 62 may have additional seats (not illustrated) installed therein. The first mesh section 12 is installed on the vehicle 43 such that the first top edge 18 attaches to the windshield frame 50 with the snaps 40 mating with corresponding snaps (not illustrated) on the windshield frame 50 (or eyelets on the first top edge 18 mating with corresponding hooks on the windshield frame 50, or a section of hook and loop material on the first top edge mating with a corresponding section of hook and loop material on the windshield frame 50, etc.). The first flap 26 encompasses the left or driver's door frame 54 and attaches to the first mesh section 12 via the first section of hook and loop material 30 that meshes with the first mesh section 12 and the second flap 28 encompasses the right or passenger's door frame 54 and attaches to the first mesh section 12 via the second section of hook and loop material 32 that also meshes with the first mesh section 12. The bottom edge 20 of the first mesh section 12 can be draped down behind the seats 46 and attached appropriately behind the seats 46 (via the eyelets 42 that mate with appropriate hooks, or other appropriate attachment mechanism—snaps, hook and loop material etc.,—as desired) or can be rolled about the roll bar 60 in order to encompass the roll bar 60 and secured thereonto in any desired fashion in order to keep the area behind the seats 46 open. If desired, the block member 38 can be slid into the pocket 34 in order to block the sun above the passengers of the vehicle 43.

Figure 8:
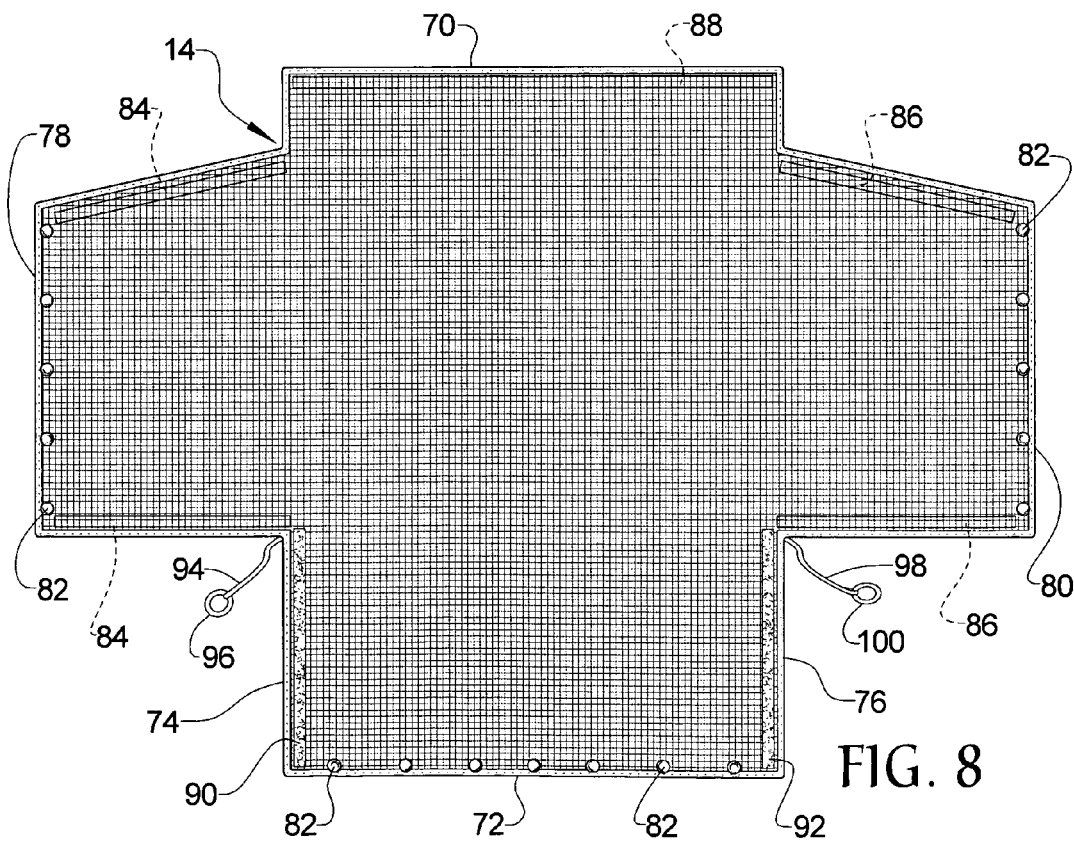
FIG. 8 is a top plan view of the cargo compartment section of the convertible vehicle mesh cover of the present invention.
Figure 9:
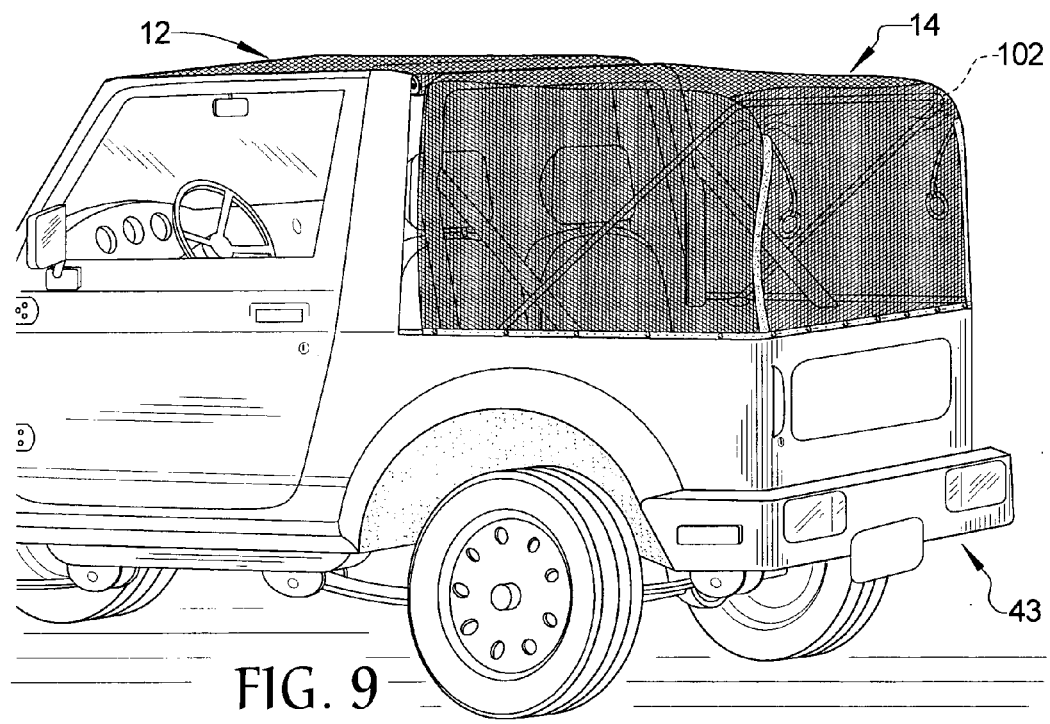
FIG. 9 is a perspective view of the cargo compartment section installed on a vehicle in square back fashion.
Figure 10:
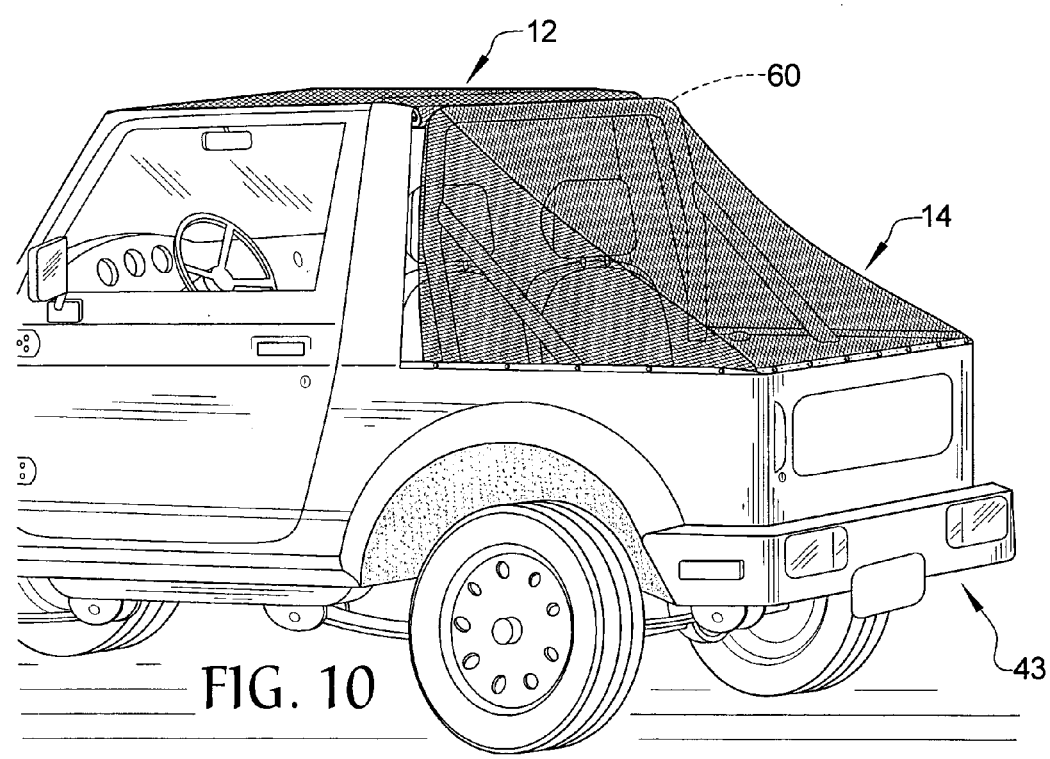
FIG. 10 is a perspective view of the cargo compartment section installed on a vehicle in fast back fashion.

As seen in FIGS. 8–10, the second mesh section 14 has a second top 70, a second bottom 72, a third side 74, a fourth side 76, a third flap 78 extending from the third side 74, and a fourth flap 80 extending from the fourth side 76. Snaps 82 are located along the second bottom edge 72, the third flap 78, and the fourth flap 80. A third section of hook and loop material 84 is located on the third flap 78, a fourth section of hook and loop material 86 is located on the fourth flap 80, a fifth section of hook and loop material 88 is located along the second top 70, a sixth section of hook and loop material 90 is located long the third side 74, and a seventh section of hook and loop material 92 is located along the fourth side 76. A first strap 94 having an eyelet 96 is attached to the second mesh section 14 at the meeting of the third side 74 and the third flap 78 while a second strap 98 having an eyelet 100 is attached to the second mesh section 14 at the meeting of the fourth side 76 and the fourth flap 80.

The second mesh section 14 is attached to the vehicle 43 in order to cover the cargo area 62 either in square back fashion by securing a frame member 102 to the left side wall 64 and the right side wall 66 and positioned above the back side wall 68, FIG. 9, in fast back fashion by securing the third flap 78 to the second mesh section 14 via the third section of hook and loop material 84 that mates with the second mesh section 14 and securing the fourth flap 80 to the second mesh section 14 via the fourth section of hook and loop material 86 that also mates with the second mesh section 14, FIG. 10. In either mode of attachment, the snaps 82 located on the second bottom 72, the third side 74, and the fourth side 76 mate with corresponding snap receivers 104 located on the left side wall 64, the right side wall 66 and the back wall 68 respectively. The second top 70 either attaches to the first mesh section 12 already attached to the roll bar 60 via the fifth section of hook and loop material 88 that mates with the first mesh section 12 or the second top 70 of the second mesh section 14 encompasses the roll bar 60 and mates with the second mesh section 14 via the fifth section of hook and loop material 88. Alternately, the second mesh section 14 can be used to cover the cargo compartment 62 in tarp covering fashion with the second bottom 72 folded over onto the remainder of the second mesh section 14 and mated thereat via the sixth section of hook and loop material 90 and the seventh section of hook and loop material 92 and with the two straps 94 and 98 being used to pull the second mesh section 14 tight and the straps 94 and 98 thereafter attached to the vehicle 43 in appropriate fashion using their respective eyelets 96 and 100 that mate with corresponding hooks (not illustrated).

Figure 11:
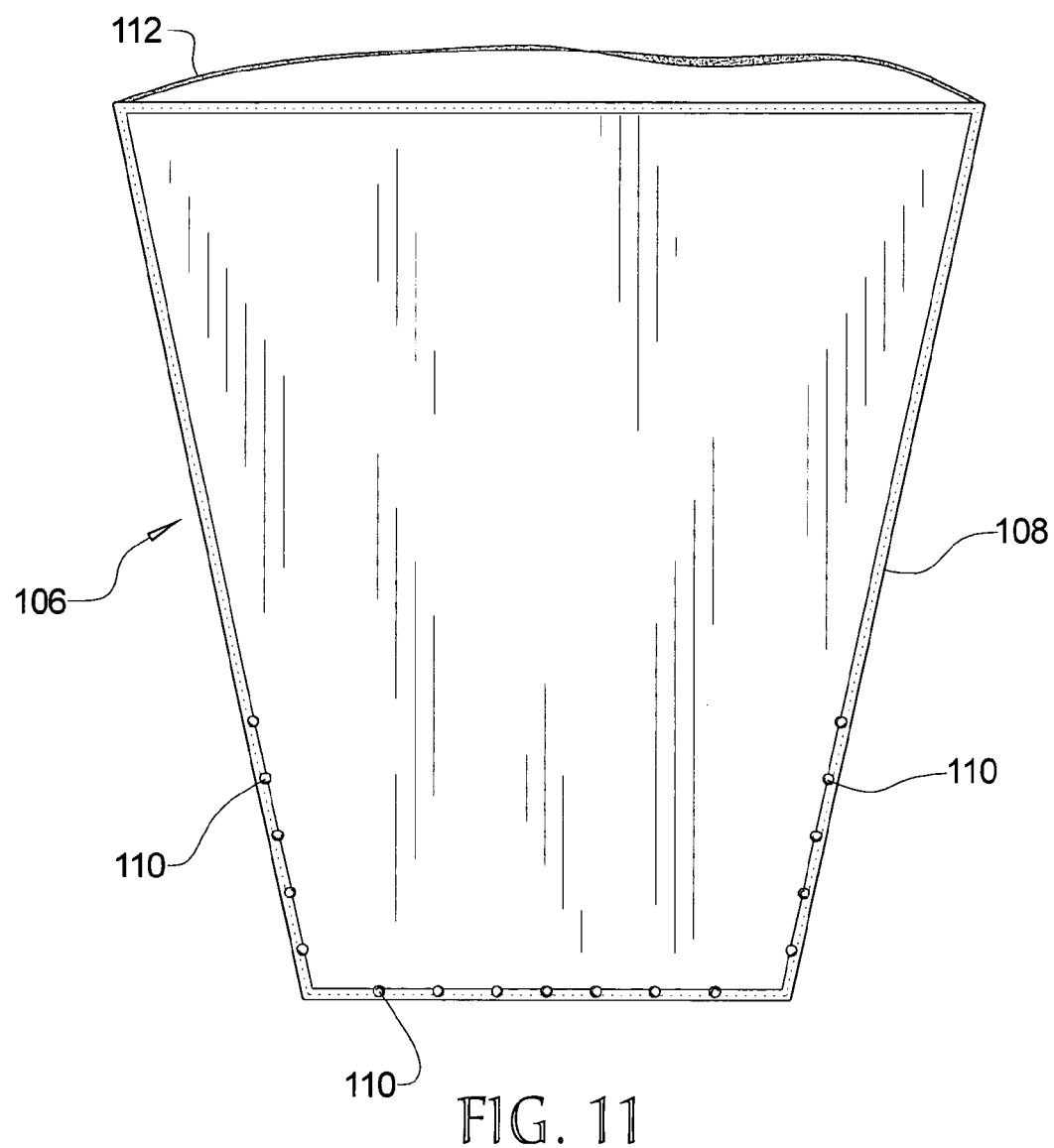
FIG. 11 is a top plan view of the carrying cover used with the convertible vehicle mesh cover of the present invention.
Figure 12:
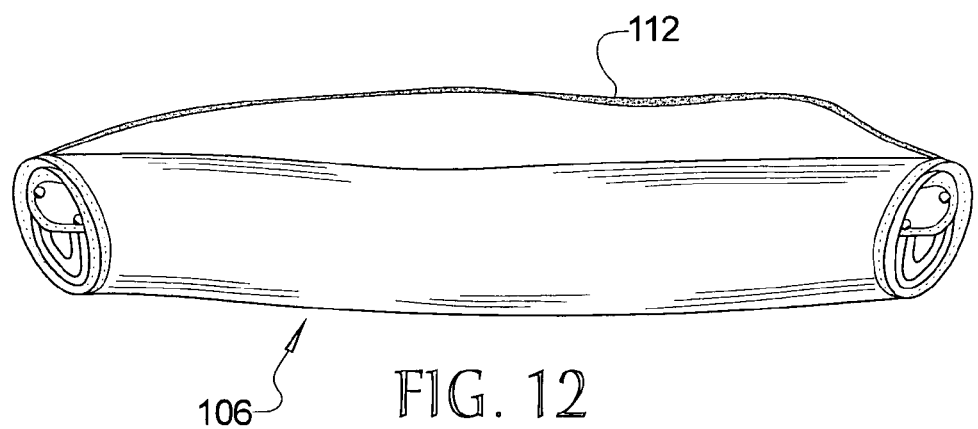
FIG. 12 is a perspective view of the carrying cover rolled up for storage.
Figure 13:
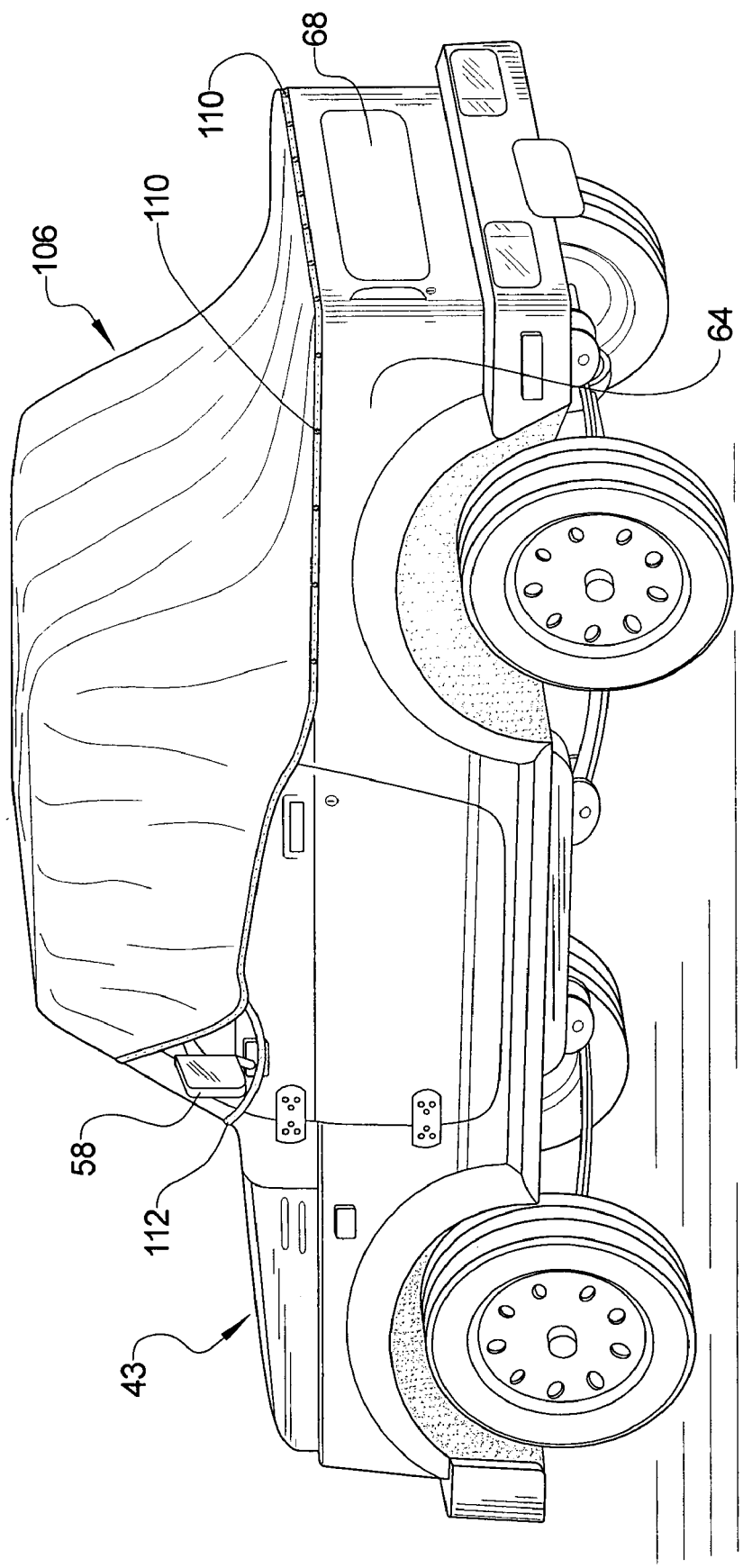
FIG. 13 is a perspective view of the carrying cover installed over a vehicle.

As seen in FIGS. 11–13, a cover 106 is provided that has an outer periphery 108 with snaps 110 located along a portion of the outer periphery 108. A handle 112 is attached to the cover 106. As best seen in FIG. 13, when use of the vehicle 43 is not needed, the cover 106 can be installed onto the vehicle 43 in covering relationship with the snaps 110 on the cover 106 being received by the snap receivers 104 located on the vehicle 43 and the handle 112 on the cover 106 is stretched over the mirrors 58 of the vehicle 43. The cover 106 can also be rolled up, with the first mesh section 12 and the second mesh section 14 therein and carried about by the handle 112.

While the invention has been particularly shown and described with reference to an embodiment thereof, it will be appreciated by those skilled in the art that various changes in form and detail may be made without departing from the spirit and scope of the invention.

I claim:

1. A covering for a convertible vehicle, the vehicle having a passenger compartment with a roof with an opening, a windshield frame, a driver door frame, a passenger door frame, and a pair of mirrors, and a cargo compartment having a left side wall, a right side wall, and a back wall, a pair of passenger seats, and a roll bar separating the passenger compartment from the cargo compartment, the covering comprising:
    a first mesh section having a first top edge, and a first bottom edge joined by a first side and a second side, a first flap extending from the first side and a second flap extending from the second side;
    a pocket located on the first mesh section between the first flap and the second flap;
    a block member removably disposed within the pocket; and
    wherein the first mesh section is installed onto the vehicle such that the first top edge is attached to the windshield frame, the first flap encompasses the driver door frame and attaches to the first mesh section, the second flap encompasses passenger door frame and attaches to the first mesh section, and the first bottom edge either attaches to the pair of passenger seats or rolls about the roll bar and attaches to the roll bar.

2. The covering as in claim as in claim 1 wherein the block member is opaque.

3. The covering as in claim 1 wherein the block member is a flexible sheet member.

4. The covering as in claim 1 further comprising:
    a first section of hook and loop material located on the first flap;
    a second section of hook and loop material located on the second flap; and
    wherein the first flap attaches to the first mesh section via the first section of hook and loop material and the second flap attaches to the first mesh section via the second section of hook and loop material.

5. The covering as in claim 1 wherein the first top edge of the first mesh section is attached to the windshield frame via at least one snap.

6. The covering as in claim 1 further comprising a second mesh cover having a second top edge, a second bottom edge joined by a third side and a fourth side, a third flap extending from the third side and a fourth flap extending from the fourth side such that the second mesh section is installed onto the vehicle by attaching the third side to the left side wall, attaching the fourth side to the right side wall, attaching the second bottom edge to the back wall and attaching the second top edge to the roll bar.

7. The covering as in claim 6 wherein the second mesh cover is installed onto the vehicle in square back fashion.

8. The covering as in claim 6 wherein the second mesh cover is installed onto the vehicle in fast back fashion.

9. The covering as in claim 8 further comprising:
    a first section of hook and loop material located on the third flap;
    a second section of hook and loop material located on the fourth flap; and
    wherein the third flap attaches to the second mesh section via the first section of hook and loop material and the fourth flap attaches to the second mesh section via the second section of hook and loop material whenever the second mesh section is installed onto the vehicle in fast back fashion.

10. The covering as in claim 6 further comprising a section of hook and loop material located on the second mesh section proximate the second top edge so that the second top edge can encompass the roll bar and attach to the second mesh section via the section of hook and loop material.

11. The covering as in claim 6 further comprising:
    a first strap attached to the third side proximate the third flap; and
    a second strap attached to the fourth side proximate the fourth flap.

12. The covering as in claim 6 further comprising a cover having an outer periphery and a handle that is removably attachable to the vehicle by attaching a portion of the outer periphery to the left side wall, the right side wall and the back wall and by hooking the handle over the pair of mirrors.

13. The covering as in claim 1 in combination with the vehicle.

14. The covering as in claim as in claim 13 wherein the block member is opaque.

15. The covering as in claim 13 wherein the block member is a flexible sheet member.

16. The covering as in claim 13 further comprising:
    a first section of hook and loop material located on the first flap;
    a second section of hook and loop material located on the second flap; and
    wherein the first flap attaches to the first mesh section via the first section of hook and loop material and the second flap attaches to the first mesh section via the second section of hook and loop material.

17. The covering as in claim 13 wherein the first top edge of the first mesh section is attached to the windshield frame via at least one snap.

18. The covering as in claim 13 further comprising a second mesh cover having a second top edge, a second bottom edge joined by a third side and a fourth side, a third flap extending from the third side and a fourth flap extending from the fourth side such that the second mesh section is installed onto the vehicle by attaching the third side to the left side wall, attaching the fourth side to the second side wall, attaching the second bottom edge to the back wall and attaching the second top edge to the roll bar.

19. The covering as in claim 18 wherein the second mesh cover is installed onto the vehicle in square back fashion.

20. The covering as in claim 18 wherein the second mesh cover is installed onto the vehicle in fast back fashion.

21. The covering as in claim 20 further comprising:
a first section of hook and loop material located on the third flap;
a second section of hook and loop material located on the fourth flap; and
wherein the third flap attaches to the second mesh section via the first section of hook and loop material and the fourth flap attaches to the second mesh section via the second section of hook and loop material whenever the second mesh section is installed onto the vehicle in fast back fashion.

22. The covering as in claim 18 further comprising a section of hook and loop material located on the second mesh section proximate the second top edge so that the second top edge can encompass the roll bar and attach to the second mesh section via the section of hook and loop material.

23. The covering as in claim 18 further comprising:
a first strap attached to the third side proximate the third flap; and
a second strap attached to the fourth side proximate the fourth flap.

24. The covering as in claim 18 further comprising a cover having an outer periphery and a handle that is removably attachable to the vehicle by attaching a portion of the outer periphery to the left side wall, the right side wall and the back wall and by hooking the handle over the pair of mirrors.

* * * * *